United States Patent [19]
Robinson et al.

[11] Patent Number: 4,744,616
[45] Date of Patent: May 17, 1988

[54] MONOLITHIC ELECTRO-OPTIC MODULATOR ARRAY

[75] Inventors: Deborah L. Robinson, La Canada; William K. Marshall; Joseph Katz, both of Pasadena, all of Calif.

[73] Assignee: California Institute of Technology, Pasadena, Calif.

[21] Appl. No.: 704,922

[22] Filed: Feb. 25, 1985

[51] Int. Cl.$^4$ .............................................. G02B 6/10
[52] U.S. Cl. .................................................. 350/96.14
[58] Field of Search ............... 350/96.11, 96.12, 96.13, 350/96.14

[56] References Cited

U.S. PATENT DOCUMENTS

| | | | |
|---|---|---|---|
| 4,199,221 | 4/1980 | Rivoallan et al. | 350/96.14 |
| 4,438,447 | 3/1984 | Copeland, III et al. | 350/94.14 X |
| 4,439,004 | 3/1984 | Hunsperger et al. | 350/96.12 |
| 4,462,658 | 7/1984 | Scifres et al. | 350/96.14 |

*Primary Examiner*—Eugene R. Laroche
*Assistant Examiner*—Steven J. Mottola
*Attorney, Agent, or Firm*—Freilich, Hornbaker, Rosen & Fernandez

[57] ABSTRACT

A PIN GaAlAs diode structure is provided with parameters for index guiding of light in a single mode. The index of refraction of the central layer I (which in practice may be lightly doped $\pi$ or $\nu$) is greater than the p- and n-layers to create a slab waveguide in the transverse direction. Stripe contacts define separate waveguide channels that are separated electrically and optically by implanting protons or etching grooves between the stripe contacts in the upper layer. Separate reverse biasing voltages may be applied to the stripe contacts for modulation of the light in proportions to the voltage, either with absorption modulation, if the light wavelength is within about 500Å of the bandgap of the $\pi$-material, or phase-delay modulation, if the wavelength is separated from the bandgap of the $\pi$-material by at least 900Å.

10 Claims, 6 Drawing Sheets

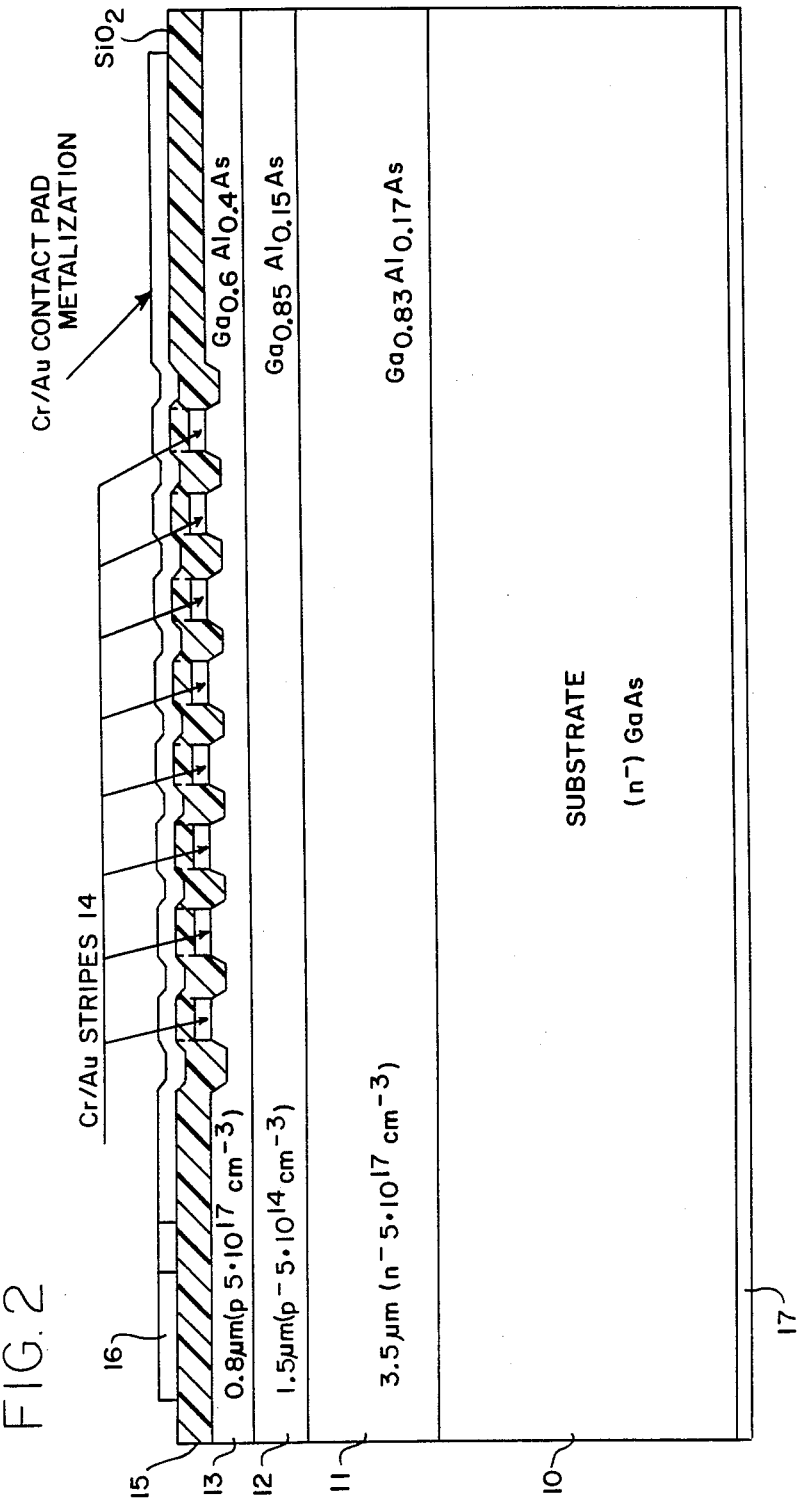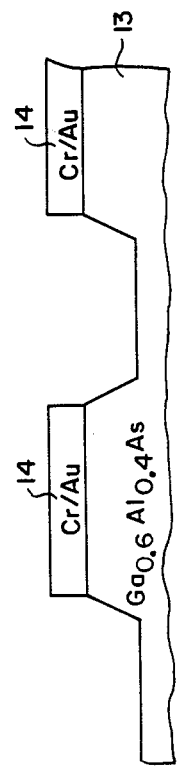
FIG. 2
FIG. 2a

MONOLITHIC ELECTRO-OPTIC MODULATOR ARRAY

ORIGIN OF INVENTION

The invention described herein was made in the performance of work under a NASA contract, and is subject to the provisions of Public Law 96-517 (35 USC 202) in which the Contractor has elected to retain title.

BACKGROUND OF THE INVENTION

This invention relates to integration of a plurality of electro-optic waveguide modulators on a single semiconductor substrate, for example an absorption modulator array for applications that require intensity modulation up to the multigigahertz range, or a phase modulator array such as for an accurate beam pointing system.

In the past, optical beam steering systems have consisted mainly of mirrors positioned by servomechanisms which are both massive and power inefficient. It would be desirable to provide electronic steering of laser beams to save not only power but also weight and space. Similarly, it would be desirable to provide high speed absorption or other modulation, such as polarization modulation, of an array of laser beams with spacing in the micron range.

SUMMARY OF THE INVENTION

In accordance with the present invention, a monolithic electro-optic modulator array is comprised of a reverse-biased P-I-N diode epitaxially grown on a semiconductor substrate supporting at least one propagating optical mode of operation where the central layer (I) may be comprised of several individual layers lightly doped $\pi$ or $\nu$. The index of refraction of each layer is determined mainly by its composition. These parameters are chosen to provide a higher index of refraction in the central layer which, as just noted, need not be intrinsic; it is sufficient for it to be only lightly doped. Consequently, it is to be understood that the central layer may be a $\pi$-layer (lightly p-doped) or a $\nu$-layer (lightly n-doped). The higher index of refraction in the central layer provides for waveguiding between the adjacent p and n layers. Electrical and optical separation between parallel channels is provided by either proton implantation or etching into the upper layer to a depth sufficient to lower the effective index of refraction of the region between the channels defined by the stripe contacts. The stripe contacts over the waveguide channels provide individual electro-optic control of the channels.

When the array is illuminated at one end of the waveguide channels with a wavelength that approaches the bandgap of the waveguide material within approximately 500 Å, and voltages are applied to the individual contact stripes, the light transmitted through the individual stripes is reduced in proportion to the voltage by electroabsorption. If the radiation wavelength of the illumination is widely separated from the bandgap of the waveguide material, at least by about 900 Å, phase modulation is observed.

The novel features of the invention are set forth with particularity in the appended claims. The invention will best be understood from the following description when read in conjunction with the drawings.

BRIEF DESCRIPTION OF THE DRAWINGS

FIG. 2 is a schematic diagram of the end view of a modulator array employing index guiding technique to define the waveguide channels, and FIG. 2a shows in a larger scale the etched channel on each side of the contact stripes.

DESCRIPTION OF PREFERRED EMBODIMENTS

Figure 1:
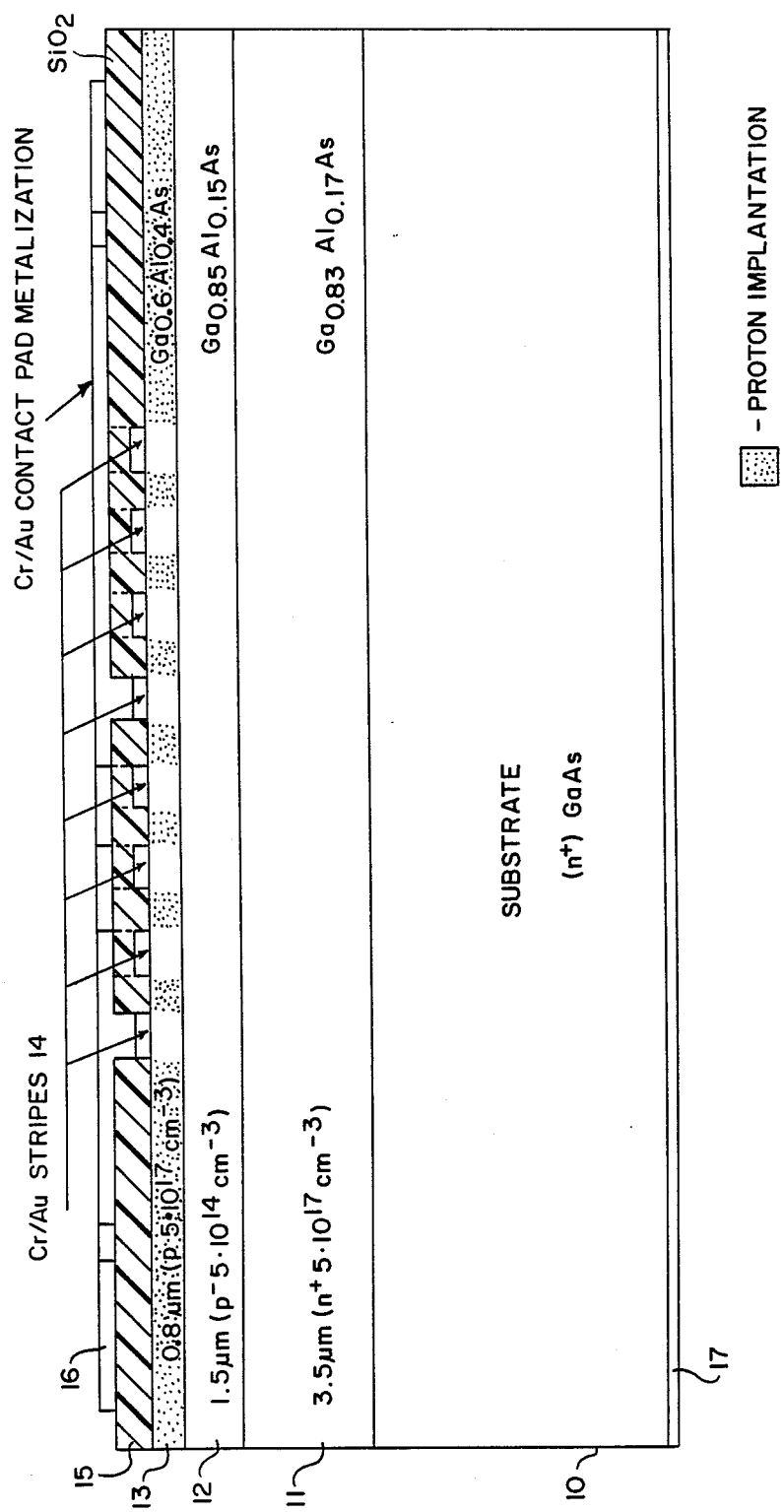
FIG. 1 is a schematic diagram of the end view of a modulator array employing proton implantation for waveguide channel separation.

The electroabsorption (Franz-Keldysh) effect can be utilized in applications requiring intensity modulation of light beams. This effect has been demonstrated in waveguides of various semiconductor materials. See Reinhart, F. K., "Electroabsorption in $Al_yGa_{1-y}As$-$Al_xGa_{1-x}As$ double heterostructure," Appl. Phys. Lett., 1973, 22, pp 372-374 and Bach, H. G., et al., "Electro-optical light modulation in InGaAsP/InP/InP double heterostructure diodes," ibid., 42 pp. 692-694. And recently also in quantum well structures. See Kingston, R. H., et al., "Fourier transformation using electroabsorption CCD spatial light modulator," IEEE J. Quant. Elect., 1983 QE-19, pp 1443-1451.

The monolithic device, shown schematically in FIGS. 1 and 3, and FIGS. 2 and 3, will first be described for this electroabsorption effect useful in applications requiring selective amplitude modulation, and then, after making a proper choice of wavelength relative to the bandgap of the semiconductor material, for their electro-optic effect useful in applications requiring selective phase modulation in each of an array of waveguide channels. For convenience, the same reference numerals are employed for the corresponding parts of the two embodiments.

The ultimate choice of semiconductor material may sometimes be determined by the system considerations. However, in most cases the preferred choice is a material out of which semiconductor injection lasers can be made in order to provide a monolithic laser source and modulator. An example of a material is the AlGaAs ternary system used in the preferred embodiments illustrated.

Referring to FIGS. 1 and 2, fabrication of the device (of either embodiment) starts with an n+-GaAs substrate 10 on which three epitaxial layers 11, 12, 13 are grown, preferably employing molecular beam epitaxy (MBE) or metal organic chemical vapor deposition (MOCVD). The parameters of the layers are as follows: 3.5 $\mu$m $Ga_{0.83}Al_{0.17}As$ (n+-type, $\sim 5 \cdot 10^{17}$ cm$^{-3}$); 1.5

μm Ga$_{0.85}$Al$_{0.15}$As (undoped or π, ~5·10$^{14}$ cm$^{-3}$) and 0.8 μm Ga$_{0.6}$Al$_{0.4}$As (p-type, ~5·10$^{17}$ cm$^{-3}$). Next a group of eight 5 μm-wide Cr/Au stripes 14 are deposited with a 9 μm center-to-center separation. The three-layer structure constitutes a single-mode slab waveguide in the transverse (vertical) direction.

In order to define the waveguide channels in the lateral (horizontal) direction, and to provide electrical and optical separation between the array elements, proton implantation is provided as indicated in FIG. 1 by stipple in the ion implanted areas everywhere in the upper layer 13 except under the metal stripes 14, or etching is performed as shown in FIG. 2. A large scale drawing of the etched layer between contact stripes is shown in FIG. 2a. To accomplish that, thick photoresist is placed on top of the Cr/Au stripes serving as either the implantation mask for the former (implantation parameters: energy 160 keV; dose −3·10$^{15}$ cm$^{-2}$), or the etching mask for the latter.

The etch need only be a fraction of the thickness of the upper layer 13, such as 0.2 μm for a layer of about 0.5 μm. While a deeper etch may be desirable from the standpoint of lowering the index of refraction of the material under the etch, even so deep as to etch into the beam guiding layer 12, it is also desirable to be able to easily carry out the second metallization process for the contact pad pattern. Therefore, a compromise of a thinner upper layer 13 and shallower etch of grooves would appear to be optimum. By making the upper layer thinner, a shallower etch can be brought closer to the beam guiding layer 12, and thus lower its effective index of refraction in the regions under the etched grooves for lateral beam guidance in the channels under the contact stripes between etched grooves.

Figure 3:
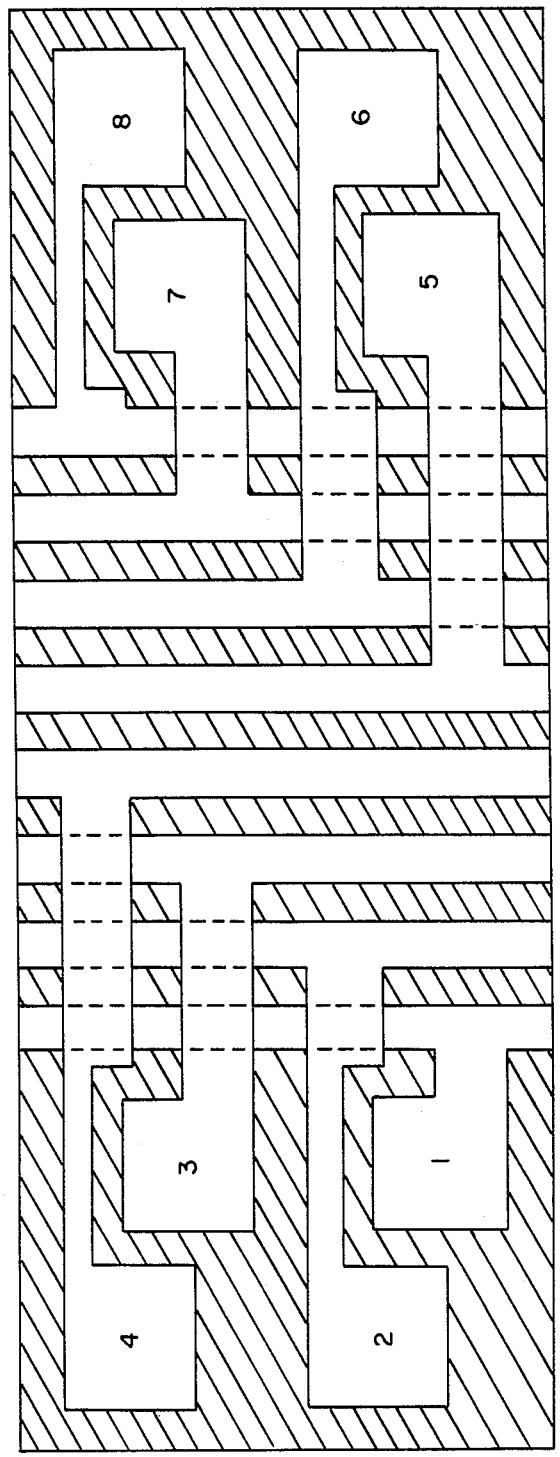
FIG. 3 is a plan view showing the two-level metalization stripe contact pattern for controlling the separate modulator channels of the array of FIG. 1 or FIG. 2.

After depositing the contact stripes, and either implanting ions or etching on both sides of each stripe, an SiO$_2$ film 15 is deposited and stripe contact holes are opened for a second metallization of Cr/Au in a pattern 16 that provides separate contact pads 1 through 8, as shown in FIG. 3, for each conductor stripe 14 using standard photolithographic techniques, for both the embodiment of FIG. 1 and of FIG. 2. That second metallization on a separate level completes the contact pattern. The two-level metalization technique is required because the separation between two adjacent channels is smaller than the area needed for a contact pad.

The final steps for this process of making a plurality of devices on a wafer involves lapping of the wafer, evaporating AuGe/Au for the n-side contact 17, shown in FIGS. 1 and 2, alloying, and cleaving into individual devices, each having a plurality of parallel channels.

The array channels in each embodiment (FIG. 1 and FIG. 2) are both single-mode dielectric waveguides and p-π-n or p-ν-n heterojunction diodes. An electric field is effected by reverse biasing the device. The region in the central layer 12, where virtually all the applied voltage is developed, is also the region with a higher index of refraction. Thus, most of the mode energy is guided in the high field region, resulting in optimum electroabsorption or phase delay interaction. The proton implantation between stripe contacts provides both lateral optical guiding and electrical separation between adjacent channels. Alternatively, index guiding may be achieved by etching between stripe contacts, as noted with reference to FIG. 2 and FIG. 2a, thereby further increasing the difference between the high index of refraction of the material under the stripes and the etched material between the stripes, which again provides both lateral optical guiding and electrical separation between channels, but with greater waveguide efficiency (i.e., less loss of light being guided through the channels).

Figure 4A:
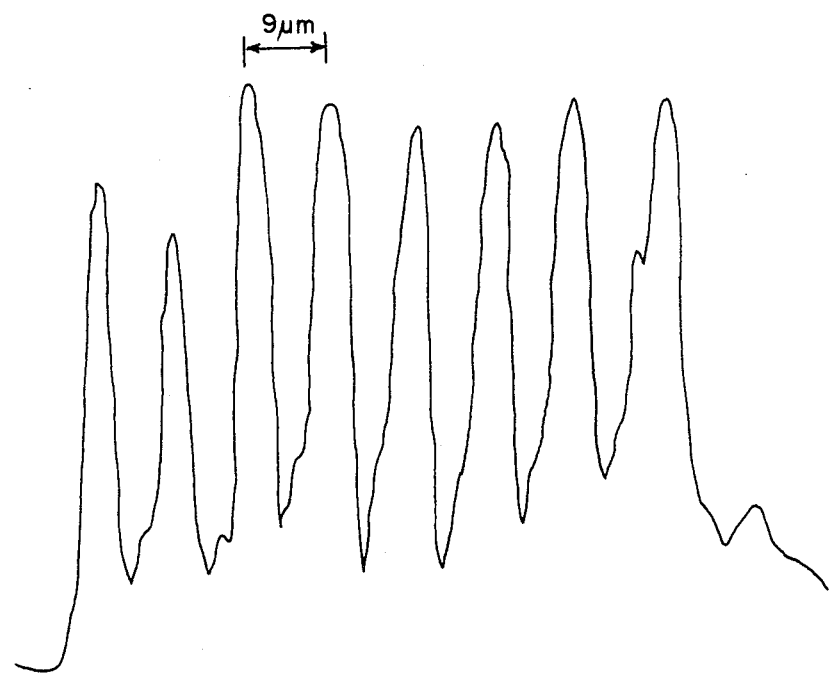
FIG. 4a illustrates typical near-field scan of intensity amplitude for the device of FIGS. 1 and 2 in the case of no applied voltage on the waveguide channels operated as electroabsorption modulators.
Figure 4B:
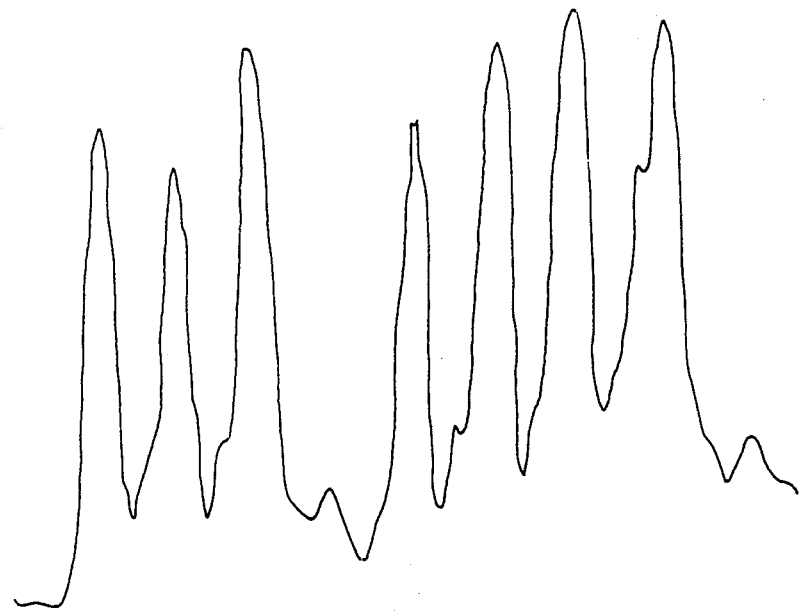
FIG. 4b illustrates a typical near-field scan when a high reverse-bias voltage is applied to an individual modulator channel.

The device of FIGS. 1 and 3 was tested for the electroabsorption effect by illuminating the entrance facet with a focused beam from a semiconductor laser having a wavelength that approaches the bandgap of the waveguide material to within 500 Å. The magnified image of the array output was focused on a silicon target infrared camera and profiled with a video analyzer. A typical near-field scan for the case of no applied voltage on the device channel stripes is shown in FIG. 4a. The eight channels are clearly resolved. The waveguiding in the lateral direction (as effected by the proton implantation) is similar to that of gain-guided lasers, resulting in astigmatism of the output beam. When increasing voltages were applied to individual modulator stripes, the light output was reduced and finally virtually eliminated due to electroabsorption. A typical near-field scan describing this situation for one channel is shown in FIG. 4b. The applied voltage in this case was 35 V. The slight dip in the transmittance of the channel adjacent to the modulated channel is due to some residual electrical coupling which could be eliminated in principle, by a deeper proton implantation, or for some applications enhanced by a more shallow implantation.

Figure 5:
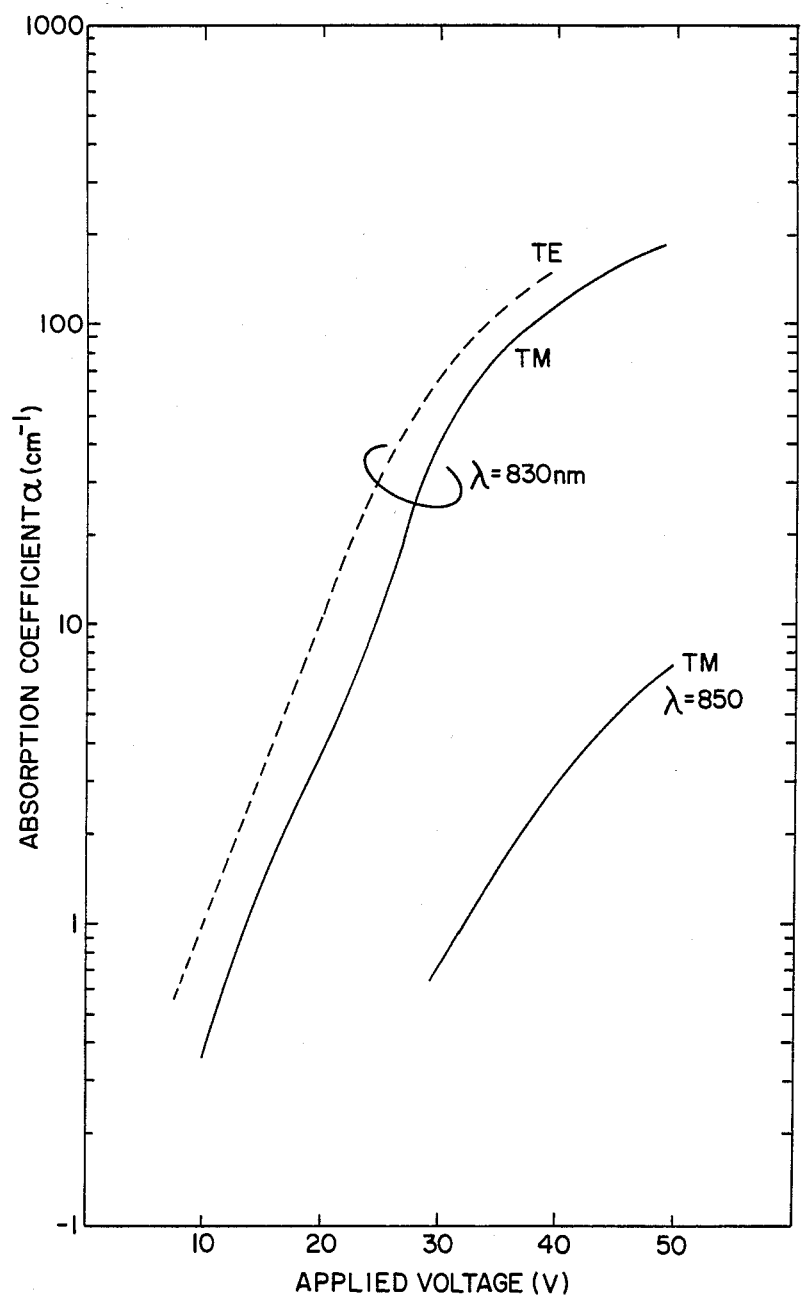
FIG. 5 is a graph of absorption coefficients as a function of applied voltage for the device of FIG. 1.

The dependence of the electroabsorption extinction coefficient ($\alpha$) on the applied voltage, light wavelength, and polarization was also investigated. The basic results are summarized in FIG. 5 for a device having channels of 250 μm length. It is clearly seen that the electroabsorption coefficient is proportional to the applied voltage, i.e., increases with increased voltage, as expected. The electroabsorption achieved as a function of applied voltage can be expected to increase exponentially as a function of the length L as well as the absorption coefficient $\alpha$, i.e., absorption is proportional to $e^{\alpha L}$, and $\alpha$ is proportional to the applied voltage, as shown in FIG. 5.

As the wavelength of the light is increased, the energy difference between the incident photons and the bandgap increases. Thus, electroabsorption effects start to become noticeable only at higher applied voltages. This can be seen by comparing the 830 nm with the 850 nm curves in FIG. 5. The magnitude of the electroabsorption effect also depends on the polarization of the light. TM polarized light (i.e., electric field vector in the vertical direction) is absorbed less than TE polarized light of the same wavelength. This can be explained by the different confinement factors of the modes corresponding to the two polarizations, which results in a different degree of interaction with the electric field.

This device may be useful in applications which require intensity modulation and switching of light. In its most basic application, the array can operate as a demultiplexer, with one source illuminating the front facet of the array, and the voltages applied to the contacts selecting the channels where the light can propagate unattenuated. Such devices may be constructed to operate at high speeds because the electroabsorption effect is intrinsically very fast.

This monolithic device may also be operated as a phase modulator when the radiation wavelength is further separated from the bandgap of the waveguide material by at least 130 meV (i.e., about 900 Å) so that electroabsorption does not obscure the inherent phase modulation believed to be present even while operated as an electroabsorption modulator. Theoretical analysis predicts that phase modulation of up to 2 radians for an array of eight channels could be achieved in 250 μm long modulator devices.

Figure 6:
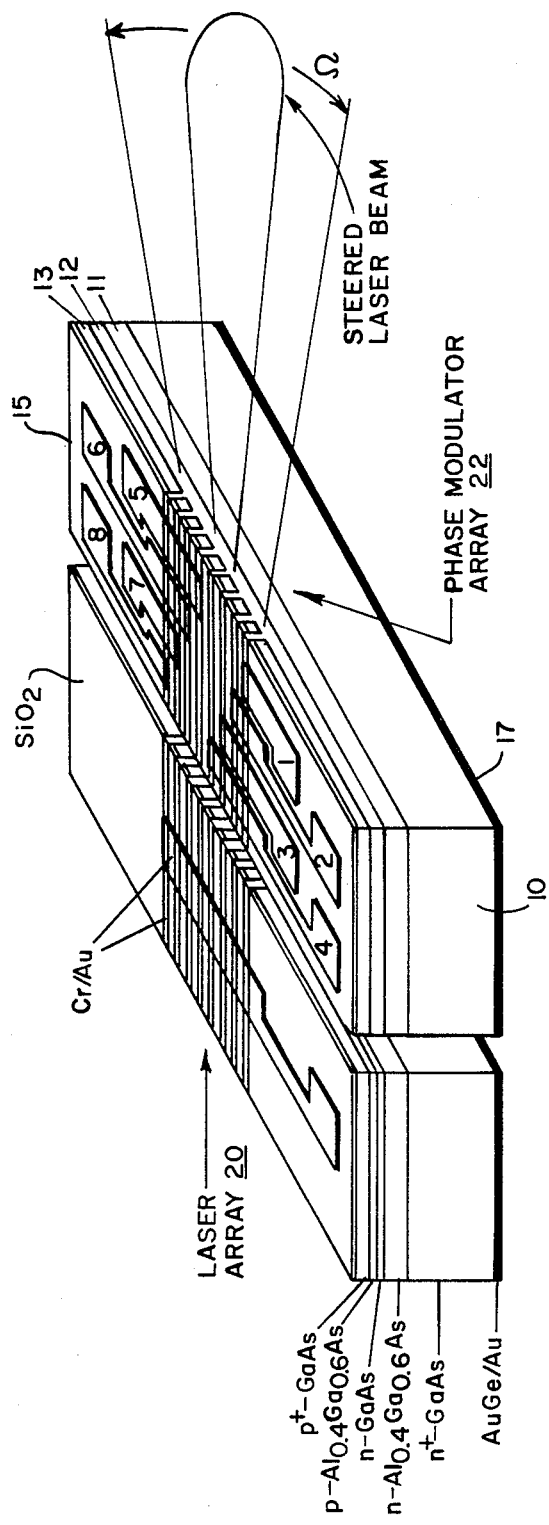
FIG. 6 illustrates the device of FIG. 1 or FIG. 2 in the case of the illuminating wavelength sufficiently greater than the bandgap of the semiconductor material for controlled phase modulation in order to achieve beam steering of the radiation output of the array.

This device may then be useful for electronic steering of laser beams by so controlling the voltage applied to each contact as to alter the relative phase delay characteristics of the channels separately, as shown in FIG. 6, which illustrates a diode laser array 20 having eight strip lasers illuminating a phase modulator array 22 having eight channels defined by stripe contacts in accordance with the present invention. The strip laser array is shown with a common contact, but separate contacts may be provided for each strip laser in a manner disclosed in a copending application Ser. No. 494,790 filed May 16, 1983, by Joseph Katz, Amnon Yariv and Shlomo Margalit, and assigned to the assignee of this application, with electrical isolation between strip lasers provided by proton implantation, etching or other means.

In practice, the two arrays may be produced on a common substrate as an integrated (monolithic) optical circuit. That is a distinct advantage of selecting the waveguide material to be GaAlAs that may also be used in the active region of the strip diode lasers. All of the steps in the fabrication of cleaved strip laser arrays are well known, and have been published in the literature. The only additional step required for this application is the selective etching of the strip waveguide mirrors opposite the modulation channels. This is also a known technique published in the literature. See "Short-Cavity GaAlAs Laser by Wet Chemical Etching" by N. Bouadma, et al., Electronics Letter, Vol. 18, pp 879–880 (1982) and references cited therein.

Consider an array of N identical electro-optical (E-O) waveguide modulators, whose center to center spacing is D. The electrical near field pattern of each channel (identical channels are assumed for simplicity) is denoted by E, and the phase of th n-th modulator (with respect to the first one) is $\phi(n)$. The total near-field pattern of the array is thus $$E_{tot}(x) = \sum_{n=0}^{N-1} E(x - nD) e^{i\phi(n)} \quad (1)$$

where $\phi(0)=0$ is assumed without loss of generality. Because of the basic Fourier Transform relationship between the near field and far-field patterns, we can express the intensity distribution of the far field as $$U_{tot}(\theta) = U(\theta) \left| \sum_{n=0}^{N-1} \exp i[k \, n \, D \sin + \phi(n)] \right|^2 \quad (2)$$

where $k=2\pi/\lambda$ is the magnitude of the free-space propagation vector. $U(\theta) = \cos \theta \cdot [E(x)]^2$ is the far-field intensity pattern of a single waveguide and · indicates the Fourier transform.

It can be shown that if $$\phi(n) = N \cdot \phi_o \quad (3)$$

(i.e., a linear phase shift is applied across the array), then Eq. (2) can be rewritten in the form $$U_{tot}(\theta) = U(O) = \frac{\sin\left[\frac{N}{2}(kD\sin\theta + \phi_o)\right]^2}{\sin\left[\frac{1}{2}(kD\sin\theta + \phi_o)\right]} \quad (4)$$

Examining Eq. (4) shows that it describes the tilting of the far-field radiation pattern by an angle which is given (for small angles) by $$\theta_{tilt} = \frac{\phi_o}{kD} \quad (5)$$

If the maximum phase shift that can be affected by the E-0 effect in the waveguide channel is $\phi_{max}$, then it is clear that $\phi_o{}^{max} = \phi_{max}/(N-1)$. If $\phi_{max} < 2\pi$, the maximum range of beam scanning that can thus be affected is given by $$\theta_{max} = \frac{\phi_{max}}{kD(N-1)} \quad (6)$$

As an example, consider as N=8, D=9 μm and λ=0.85 μm case. For $\phi_{max}=1$ radian, we obtain $\theta_{max}=0.12$ degrees. A more meaningful figure of merit is to compare $\theta_{max}$ with the angular width of the main lobe of the far field intensity pattern. From Eq. (4) we find that this angle is given by $$\theta_{beam} = \frac{2\pi}{kDN} \quad (7)$$

Thus the maximum amount of beam scanning relative to the beam width is $$\frac{\theta_{max}}{\theta_{beam}} = \frac{N}{N-1} \cdot \frac{\phi_{max}}{2\pi} \quad (8)$$

The example described above corresponds to a range of approximately 18% of the width of the main lobe.

Much larger dynamic ranges can be obtained if it is possible to achieve phase shifts of at least $2\pi$ radians within each channel, which requires channel lengths of about 800 μm. Since for each phase there is a corresponding equivalent phase in the interval [0, $2\pi$], it is possible in this case to affect beam steering to virtually any angle within the far field radiation pattern of an individual channel (i.e., angles where U($\theta$) assumes non-negligible values). For example, an eight element array with the phases of 0, $\pi/2$, $\pi$, $3\pi/2$, $2\pi$, $5\pi/2$, $3\pi$, $7\pi/2$ is equivalent to an array with the following set of phases: 0, $\pi/2$, $\pi$, $3\pi/2$, $2\pi$, $\pi/2$, $\pi$, $3\pi/2$. They both correspond to the case where $\phi_o = \pi/2$ and thus to an angular tilt of $\lambda/4D$ (Eq. 5).

Although particular embodiments of the invention have been described and illustrated herein, it is recognized that modifications and variations may readily occur to those skilled in the art. For example, by selecting a material that exhibits a Faraday effect in response to applied voltage, polarization modulation could be achieved in the channels optically and electrically separated in accordance with this invention. Another example is selecting the material for the central beam guiding layer to be nonhomogeneous by growing the layer as films of different compositions for step (or graded)

change in the electric field produced in the region of that material in response to an applied voltage. Consequently, it is intended that the claims be interpreted to cover such modifications and variations, that the term "electro-optic modulator" refer to any optical modulator which effects some form of modulation (absorption, phase delay, polarization) in response to an applied voltage, unless a specific type of effect is referred to in the claim to both electroabsorption and electro-optic phase delay, and that the term "layer," when referring to the central layer, may refer to a multiple film layer.

What is claimed is:

1. A monolithic electro-optic modulator array for modulating the intensity of light of predetermined wavelength transmitted through said array comprised of a semiconductor structure having at least three semiconductor layers on a heavily doped substrate, said three semiconductor layers consisting of a first p-type layer, a second n-type, and a third virtually intrinsic layer between the first and second layers, the composition and doping of said third layer being selected to have a greater index of refraction than the first and second layers to provide a slab waveguide capable of providing at least one propagating optical mode of light having a wavelength that approaches within approximately 500 Å the bandgap of the semiconductor material in said third layer; a plurality of parallel conductor stripes on one of said first and second layers defining in the direction of said stripes modulating waveguide channels in said third layer for said array, the thickness of said third layer and width of said stripes being selected to support only a single mode waveguide operation; a contact on the side of said substrate opposite said three layers for completing circuits to each of said channels for a reverse-bias voltage applied to said conductor stripes; and means for electrically isolating said channels, whereby light guided by each of said channels under said conductor stripes will be intensity modulated separately in each channel in proportion to the voltage applied to the stripe over the channel.

2. A monolithic electro-optic modulator array as defined in claim 1 wherein separation of channels is achieved by proton implantation between said stripes into at least said first layer.

3. A monolithic electro-optic modulator array as defined in claim 1 wherein separation of channels is achieved by etching between said stripes into at least said first layer.

4. In a semiconductor electro-optic modulator array for intensity modulating light passing through said array where the wavelength of said light approaches within approximately 500 Å the bandgap of the semiconductor material used for electro-optic modulation in said array comprised of a reverse-biased P-I-N diode structure epitaxially grown in three semiconductor layers on a semiconductor substrate consisting of an intrinsic layer lightly doped $\pi$ or $\nu$ between a p-type layer and an n-type layer with parameters chosen for said layers for forming a single-mode slab waveguide, and waveguide channels defined in said P-I-N structure by parallel stripe contacts on an outer layer thereof, and a contact on the side of said substrate opposite said three layers for completing circuits to each of said channels for a reverse bias voltage applied to said stripe contacts, wherein each p-type and n-type layer is selected to provide a higher index of refraction than said instrinsic layer for waveguiding between said p-and n-type layers, means for electrically isolating channels in said array beneath said stripe contacts, and means for applying to each of said stripe contacts a reverse-bias voltage that is individually and separately controlled.

5. A semiconductor electroptical array as defined in claim 4 wherein said isolating means is comprised of protons implanted in at least said outer layer supporting said stripes and confined to regions on both sides of each stripe.

6. A semiconductor electroptical array as defined in claim 4 wherein said isolating means is comprised of grooves etched in at least said outer layer on both sides of each stripe contact.

7. A semiconductor electroptical array as defined in claim 4 wherein semiconductor material selected for said P-I-N diode is a material out of which semiconductor diodes and waveguides can be made on a substrate of common material.

8. A semiconductor electroptical array as defined in claim 7 wherein said semiconductor material is $Ga_{1-x}Al_xAs$ for said layers epitaxially grown on a GaAs substrate, and the value of x for said n-type, intrinsic and p-type layers grown in succession is equal to about 0.17, 0.15 and 0.4, respectively, to form a single-mode slab waveguide in said intrinsic layer.

9. A semiconductor electroptical array as defined in claim 8 wherein said substrate is degenerately doped $n^+$, said n-type layer of about 3.5 $\mu$m is doped $n^+$ about $5 \cdot 10^{17}$ cm$^{-3}$, said central semiconductor layer of about 1.5 $\mu$m is doped $p^-$ about $5 \cdot 10^{14}$ cm$^{-3}$, and said p-type layer of about 0.8 $\mu$m is doped p about $5 \cdot 10^{17}$ cm$^{-3}$.

10. A semiconductor electroptical array as defined in claim 9 having contact stripes 5 $\mu$m wide deposited on said p-type layer with a spacing of 9 $\mu$m center to center to define waveguide channels, and having means on both sides of said channels for electrically and optically separating said channels.

* * * * *